(12) United States Patent
Howard et al.

(10) Patent No.: US 10,876,861 B2
(45) Date of Patent: Dec. 29, 2020

(54) INDUCTIVE POSITION DETECTOR

(71) Applicant: ZETTLEX (UK) LIMITED, Cambridgeshire (GB)

(72) Inventors: Mark Anthony Howard, Suffolk (GB); Darran Kreit, Cambridgeshire (GB)

(73) Assignee: ZETTLEX (UK) LIMITED, Cambridgeshire (GB)

(*) Notice: Subject to any disclaimer, the term of this patent is extended or adjusted under 35 U.S.C. 154(b) by 208 days.

(21) Appl. No.: 16/312,952

(22) PCT Filed: Aug. 16, 2016

(86) PCT No.: PCT/GB2016/052530
§ 371 (c)(1),
(2) Date: Dec. 21, 2018

(87) PCT Pub. No.: WO2018/002568
PCT Pub. Date: Jan. 4, 2018

(65) Prior Publication Data
US 2019/0170539 A1 Jun. 6, 2019

(30) Foreign Application Priority Data

Jun. 28, 2016 (GB) .................................. 1611173.4
Aug. 15, 2016 (GB) .................................. 1613961.0

(51) Int. Cl.
G01D 5/22 (2006.01)
G01D 11/24 (2006.01)

(52) U.S. Cl.
CPC ......... G01D 5/2208 (2013.01); G01D 11/245 (2013.01)

(58) Field of Classification Search
CPC ...... G01D 5/2208; G01D 11/245; G01D 5/20; G01D 5/2006; G01D 5/202; G01D 5/2053
USPC ...................................... 324/207.16, 207.25
See application file for complete search history.

(56) References Cited

U.S. PATENT DOCUMENTS

| 2002/0017902 | A1 | 2/2002 | Vasiloiu |
| 2009/0174396 | A1 | 7/2009 | Howard |
| 2010/0001718 | A1* | 1/2010 | Howard ................ G01B 7/30 324/207.15 |
| 2013/0021023 | A1 | 1/2013 | Niwa et al. |
| 2013/0082692 | A1 | 4/2013 | Howard et al. |
| 2014/0167746 | A1 | 6/2014 | Heidenhain |
| 2015/0025772 | A1 | 1/2015 | Gill et al. |
| 2015/0362340 | A1 | 12/2015 | Montagne |

FOREIGN PATENT DOCUMENTS

| EP | 1825224 B1 | 7/2014 |
| GB | 2506698 A | 4/2014 |
| WO | 2009053752 A2 | 4/2009 |
| WO | 2016079465 A1 | 5/2016 |

* cited by examiner

Primary Examiner — Farhana A Hoque
(74) Attorney, Agent, or Firm — Thorpe North & Western

(57) ABSTRACT

An inductive detector is provided for measuring the relative position of bodies along a measurement path comprising: an inductive target arranged along the measurement path; a laminar antenna arranged facing a portion of the target; an electronics circuit arranged along the measurement path; wherein, the inductance of at least one winding in the antenna varies continuously in proportion to the relative position of target and antenna.

19 Claims, 7 Drawing Sheets

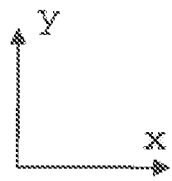
Figure 4a
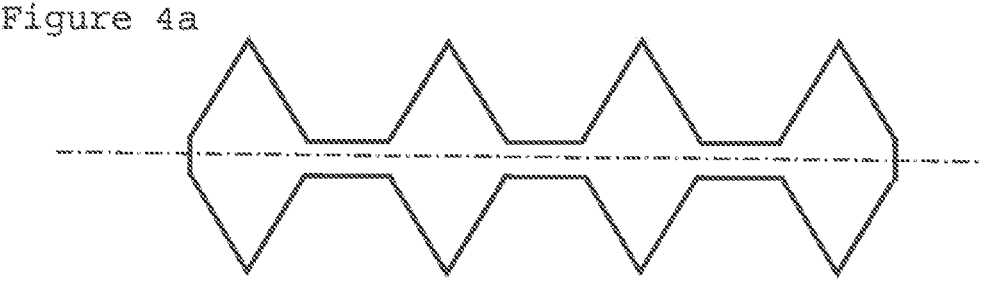
Figure 4b
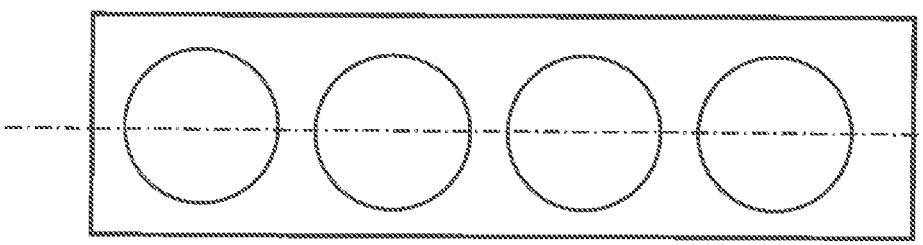
Figure 4c
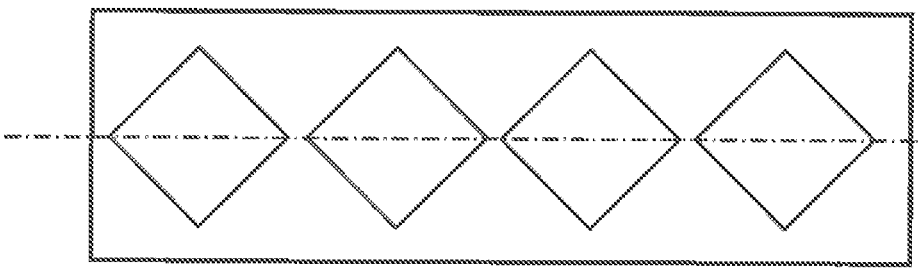
Figure 4d
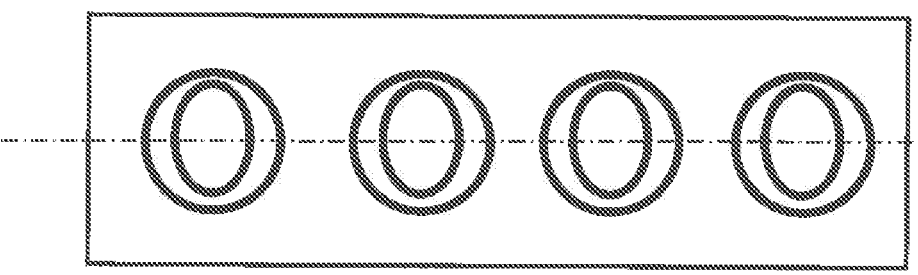

INDUCTIVE POSITION DETECTOR

FIELD OF THE INVENTION

This invention relates to an inductive displacement detector, operable to measure the displacement of relatively moveable bodies.

REVIEW OF THE ART KNOWN TO THE APPLICANT

Various forms of inductive detector have been used to measure position. Most well-known are the resolver and linearly variable differential transformer or LVDT. They have a long track record for safe, reliable and accurate operation in harsh environments. Such inductive detectors typically use wire-wound transformer constructions as their main components and are consequently bulky, heavy and costly. More recently, the authors have disclosed inductive detectors which use printed circuit boards (PCBs), rather than wound transformer constructions, to minimise bulk and cost whilst maximising measurement performance.

Such devices are sometimes referred to as inductive encoders and include the Incoder™ range of detectors made by Zettlex Ltd. of Cambridge, United Kingdom. Such detectors typically place their signal generation and processing electronics on either a separate PCB away from the detector's windings or away from detector's measurement path, so that energization of the electronics does not interfere with the inductive sensing area. Such arrangements are not sufficiently compact for some applications where space or weight is limited.

The present invention encompasses the concept of a compact, efficient, accurate and robust inductive detector to detect the relative positions of two or more bodies and which is applicable to a variety of topologies. It has particular utility for precise angular measurement in large through-shaft or hollow-bore arrangements where axial or radial space is limited.

SUMMARY OF THE INVENTION

In a first broad independent aspect, the invention provides an inductive position detector comprising a first and a second body, at least one of said bodies being displaceable relative to the other along a measurement path, the first body comprising one or more antenna windings suitable for transmitting signals or for receiving signals or for both transmitting and receiving signals; the first body further comprising an electronic circuit for energising the antenna windings for transmitting signals and for processing signals induced in the antenna windings; characterised in that the second body comprises a plurality of discrete target areas provided along the measurement path; the antenna windings and at least part of the electronic circuit overlapping different regions of the plurality of discrete areas; said discrete target areas being either electrically conductive or magnetically permeable; whereby induced signals vary in accordance with the relative position of the first and second body.

This configuration is particularly advantageous because it allows the electronic circuit to be located, in certain embodiments, in close proximity to the antenna windings instead of being located in an embedded remote location of the first body. Typically, encoders of this kind must be of sufficient thickness to avoid the electronic circuit itself causing errors in the measurement of the position. This departure from conventional thinking allows the construction of significantly more compact detectors as this construction is substantially immune to any effects of the electronic circuit since the discrete target areas are advantageously segmented or spaced apart in some embodiments. By employing significantly more compact detectors, embodiments of the invention allow the benefits of inductive sensing to be applied in a wide range and in a variety of circumstances where they would not have been with traditional constructions.

In a subsidiary aspect, the electronic circuit is located adjacent to the antenna windings. This approach reverses conventional thinking whilst allowing an advantageously compact configuration to be achieved whilst allowing accurate measurement of the relative position of the bodies. Preferably, the antenna windings and the electronic circuit are contiguously disposed. Preferably, the antenna windings and the electronic circuit are disposed substantially in the same layer of the first body. Preferably, the antenna windings and the electronic circuit are disposed in substantially the same plane and are spaced apart. Preferably, both the antenna windings and the electronic circuit face disparate or discrete target areas.

In a further subsidiary aspect, the first body and the second body are annular and configured to overlap one another, the one or more antenna windings being provided in a first section of the first body and the electronic circuit being provided in a second section of said first body; said second section being separate from said first section. This configuration is particularly advantageous in terms of forming a particularly compact annular configuration where reductions in size are even more significant.

In a further subsidiary aspect, the first body comprises a further section which is separate from the first and second sections; the further section comprising one or more further antenna windings.

In a further subsidiary aspect, the first section and the further section are provided diametrically opposite one another with the second section being provided between the first and further section.

In a further subsidiary aspect, the first body further comprises an insulating substrate and an electro-magnetic shielding layer; said insulating substrate being a carrier for the antenna windings; one or more fasteners being provided to secure the substrate to the shielding layer; the fasteners being provided outside of the first section. This configuration is particularly advantageous since it allows for a robust and efficient construction whilst allowing accurate position sensing and measurement.

In a further subsidiary aspect, the first body comprises at least two separate adjacent sets of antenna windings which overlap, in use, with at least two corresponding separate sets of target areas; each set of target areas forming a measurement path whereby two disparate measurement paths are provided adjacent to one another. This allows in certain embodiments for an accurate determination of the position.

In a further subsidiary aspect, the target areas of a first measurement path differ in configuration with respect to the target areas of a second measurement path. This allows for a coarser measurement to be employed for one of the sets and for a finer measurement to be determined with another set.

In a further subsidiary aspect, the discrete target areas form a periodic pattern of laminar conductive areas.

In a further subsidiary aspect, the discrete target areas form a periodic pattern of magnetically permeable areas.

In a further subsidiary aspect, the periodic pattern comprises areas whose width perpendicular to the measurement path varies continuously along the measurement path.

In a further subsidiary aspect, the areas are circular areas.

Preferably, the areas are elliptical.

Preferably, the areas are rectangular.

Preferably, the areas are annular.

Preferably, the discrete areas are defined by two closed loops, one of which being located within the other.

Preferably, the inner loop varies in radius about its circumference.

Preferably, the areas are part of a periodically repeating shape.

Preferably, the areas are defined by a plurality of discrete windings, each of which are provided in series with a capacitor to form a plurality of discrete resonant circuits along the measurement path.

In a preferred embodiment, an inductive detector is provided for measuring the relative position of bodies along a measurement path comprising: an inductive target arranged along the measurement path; a laminar antenna arranged facing a portion of the target; an electronics circuit arranged along the measurement path; wherein, the inductance of at least one winding in the antenna varies continuously in proportion to the relative position of antenna and target.

Preferably, at least a portion of the electronics circuit area is arranged in a plane parallel to the target.

Preferably, at least a portion of the electronics circuit area is arranged in the same plane as the antenna.

Preferably, at least a portion of the electronics circuit area faces at least a portion of the target.

Preferably, the inductive target has a periodic variation according to a first pitch distance along the measurement path.

Preferably, the measurement path is taken from the list linear, curved or circular.

Preferably, a metallic surface faces the antenna.

Preferably, a metallic surface faces the target.

Preferably, the distance normal to the measurement path between target and antenna is less than distance between the metallic surface and antenna.

Preferably, the distance normal to the measurement path between target and antenna is less than distance between the metallic surface and target.

Preferably, the target comprises at least one conductive area which forms a periodic variation of the inductive target at a first pitch distance along the measurement path.

Preferably, the target comprises at least one magnetically permeable area which forms a periodic variation of the inductive target at a first pitch distance along the measurement path.

Preferably, the antenna comprises a group of windings comprising: a transmit winding; a first receive winding comprising loops wound at a first pitch distance along the measurement path where adjacent loops have opposing magnetic polarity; a second receive winding comprising loops wound at a first pitch distance along the measurement path where adjacent loops have opposing magnetic polarity and whose loops are displaced by a distance along the measurement path relative to the first receive winding.

Preferably, the target comprises at least one conductive area which forms a second periodically varying inductive target at a first pitch distance along the measurement path.

Preferably, the target comprises at least one magnetically permeable area which forms a second periodically varying inductive target at a first pitch distance along the measurement path.

Preferably, the first and second variations form a unique spatial pattern along at least a portion of the measurement path.

Preferably, the antenna comprises a second group of windings comprising: a third receive winding comprising loops wound at a second pitch distance along the measurement path where adjacent loops have opposing magnetic polarity; a fourth receive winding comprising loops wound at a second pitch distance along the measurement path where adjacent loops have opposing magnetic polarity and whose loops are displaced by a distance along the measurement path relative to the third receive winding.

Preferably, at least one winding from the first group overlaps at least one winding from the second group.

BRIEF DESCRIPTION OF THE DRAWINGS

In the accompanying drawings:

FIGS. 4a, 4b, 4c & 4d show various inductive targets in plan view.

DESCRIPTION OF THE PREFERRED EMBODIMENT

Figure 1:
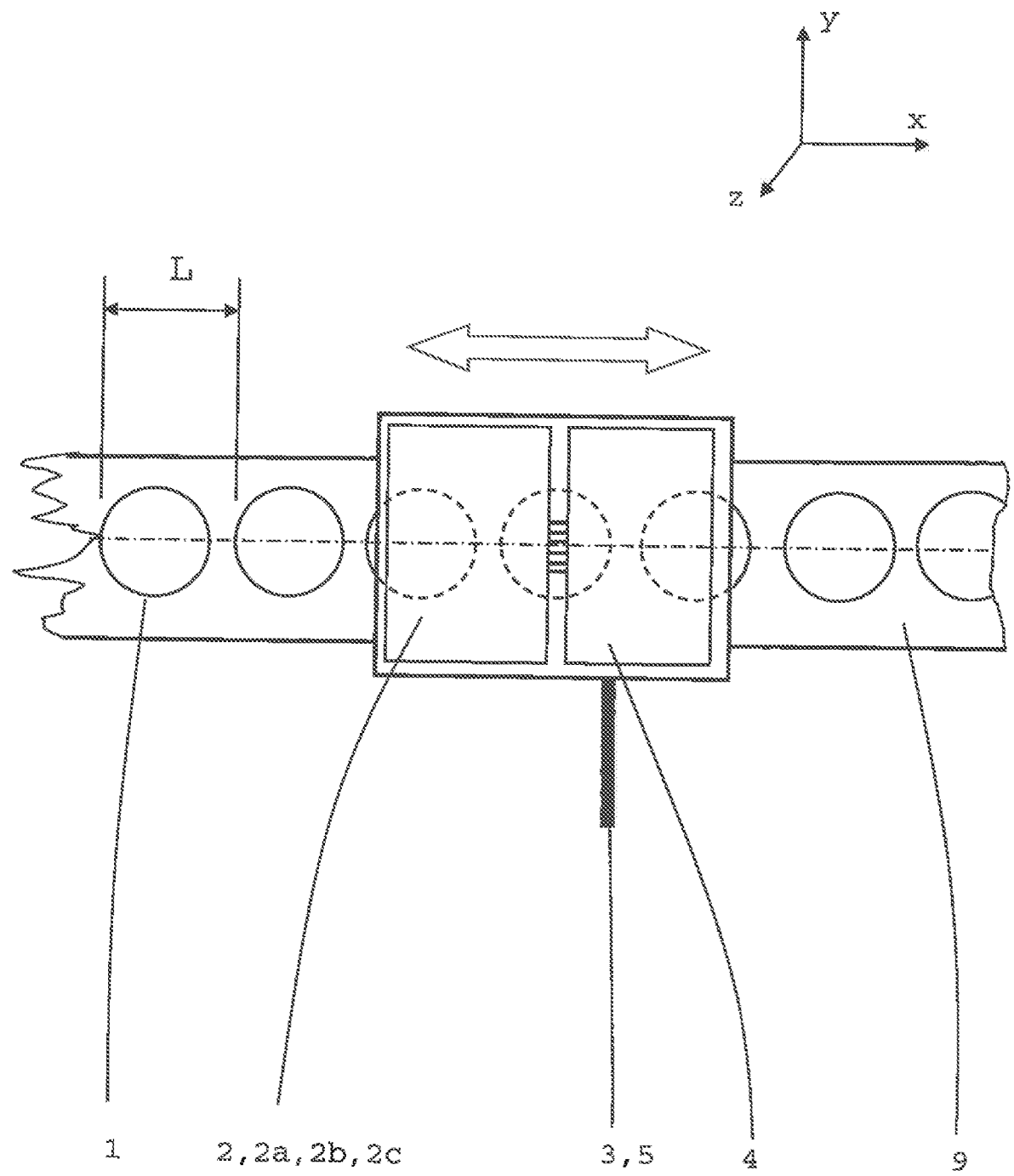
FIG. 1 shows a plan view, simplified schematic of a linear form of the detector.

FIG. 1 shows a simplified schematic of the detector. An inductive target 1 and an antenna 2 are arranged for relative movement along a measurement path—the x-axis. A target carrier 9 carries a target 1 which is formed by a periodic pattern of conductive, laminar target areas along the measurement path. The periodic pattern has a pitch distance L. The target carrier 9 is an insulating, laminar substrate. The antenna 2 is a laminar construction of conductive tracks on a laminar, insulating substrate and a multi-layer PCB is an advantageous construction method. The antenna 2 comprises a transmit winding 2c cooperating with two receive windings 2a and 2b. The winding arrangement is described in more detail later. The receive windings 2a and 2b are spaced along the measurement (x) axis relative to each other. The transmit winding 2c is energised from a power supply 3 via an electronics circuit 4 which advantageously occupies an area of the same PCB as the antenna 2 but displaced along the measurement axis facing another portion of the target. The electronic circuit 4 generates an AC signal preferably in the range 10 kHz to 10 MHz. Consequently, the transmit winding 2c forms an AC electromagnetic field which envelopes at least a portion of the target 1. The mutual inductance between the transmit winding 2c and the receive windings 2a & 2b varies continuously according to the position of the target 1 along the measurement path. The arrangement enables the energization of the electronics circuit 3 to not substantially affect the inductive sensing in the vicinity of the antenna 2. Advantageously, any effect that the energisation of the electronics circuit 4 has on nearby targets is independent of the signals sensed by the antenna 2. This is important for good sensor performance. The target areas 1 can be produced from magnetically permeable or electrically conductive material and may be produced using a variety of techniques including areas of copper etched on a laminate such as those used for printed circuit boards; an area or areas of conductive ink printed on an insulating substrate; a punched metal strip or mechanical features on a machined or formed component. Etched copper PCB constructions have been found to be advantageous due to the high levels of consistency and accuracy inherent with photolithographic processes. The windings 2a, 2b and 2c are formed as tracks on a multi-layer, laminar, printed circuit board such as 0.8 mm thick, FR4 with 1 ounce copper. Electrical insulation between parts of a winding is enabled using plated via holes at any cross over points of the winding conductors. Whilst this embodiment envisages the use of one transmit winding and two receiving windings, fewer or significantly more numerous sets of windings may be employed depending on the application envisaged.

Figure 2:
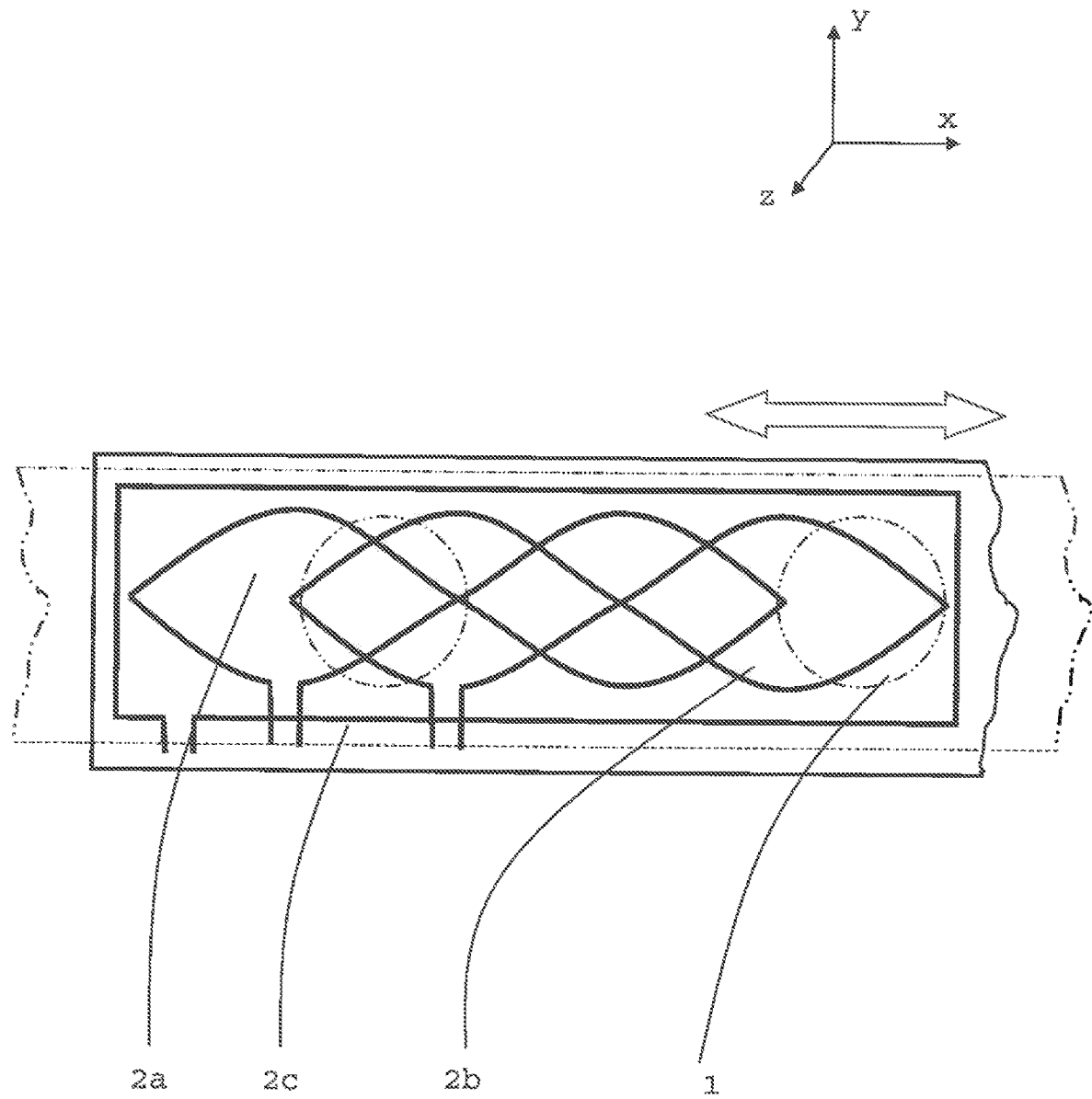
FIG. 2 shows an arrangement of antenna windings.

FIG. 2 shows a simplified form of the antenna 2 and its windings 2a. 2b and 2c. Each of the receive windings 2a and 2b is wound in 2 loops of opposing polarity and of substantially the same area. Embodiments are envisaged with much larger number of loops and with different shapes and configuration. The loops are configured to provide electrical balance between the transmit winding 2c and receive windings 2a and 2b so that no or low signal appears at the receive windings 2a and 2b in the absence of a target 1. The receive windings 2a and 2b are displaced along the measurement axis relative to each other by ¼ the pitch distance L. As the antenna 2 moves along the axis, the mutual inductance between the transmit 2c and receive windings 2a and 2b varies continuously according to the position of the antenna 2 relative to the target areas 1. When maximum coupling occurs in the first winding 2a, the coupling in the second winding 2b is at its zero value. The received voltages $V_{rx1}$ and $V_{rx2}$ in the first and second receive windings 2a and 2b form a sinusoidal and cosinusoidal variation along the x-axis. The receive windings 2a and 2b need not be sinusoidal as shown but, as will be appreciated by those skilled in the art, may be rectangular or other shapes. The position of the antenna 2 relative to the target 1 may be determined by a simple arctan calculation. Since the signal $V_{rx1}$ in the first receive winding 2a is proportional to sin(x) and the signal $V_{rx2}$ in the second winding 2b is proportional to cos(x), then the position 'x' of the windings along a pitch can be obtained from the equation $(L/2pi)*ARCTAN((V_{rx1})/(V_{rx2}))$.

The antenna 2 is connected to an electronic circuit 4 which is energised by an electrical power supply 3 and outputs signals 5 in accordance with the relative position of the antenna 2 and target 1. The power supply 3 and output signals 5 are carried on wires of a shielded, multi-core cable. The electrical outputs may be in a variety of forms including serial peripheral interface (SPI), synchronous serial interface (SSI), RS-422 A/B pulses, 0-5 VDC or 4-20 mA. A power supply 3 to the electronics circuit of 5 VDC with a current of <100 mA is preferable. Preferably, the detector's printed circuit boards for the antenna 2 and electronics circuit 3 are protected from humidity and fluids with a conformal coating.

Figure 3:
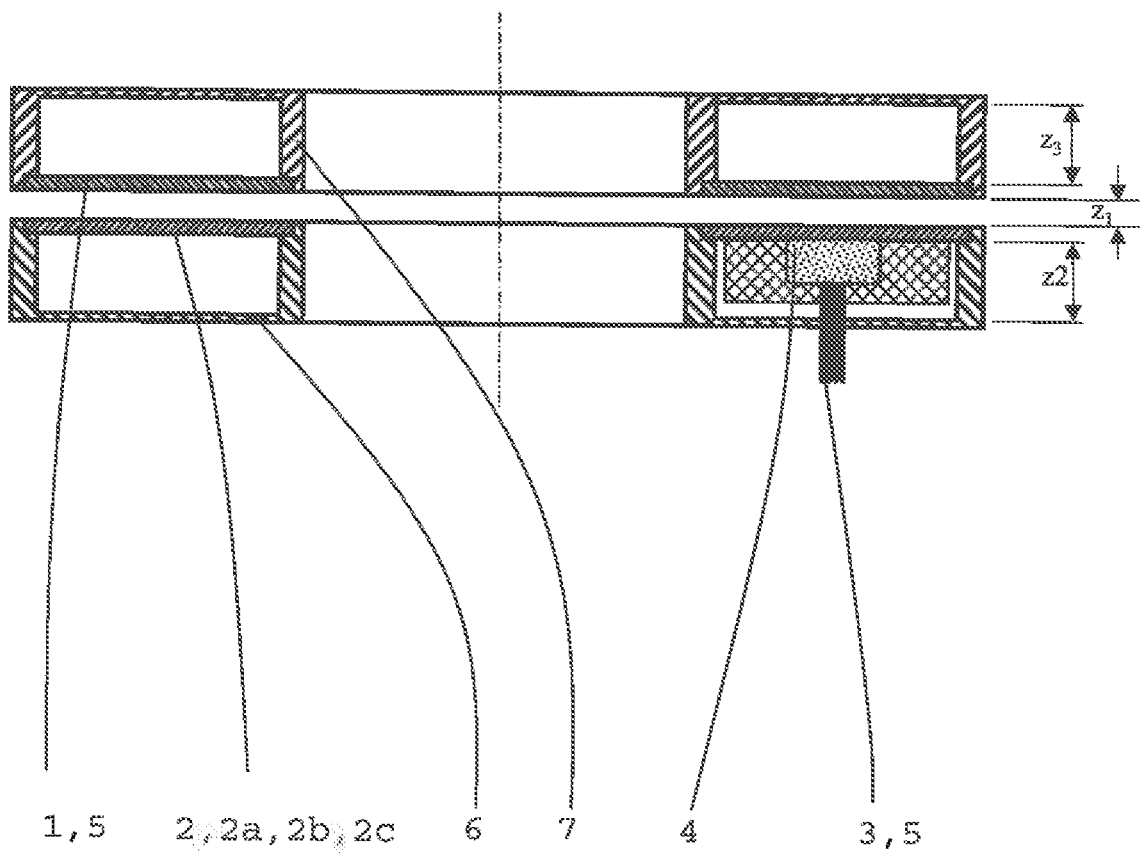
FIG. 3 shows a centre-line section through a rotary, hollow-bore form of the detector.

Whilst the bodies in FIGS. 1 and 2 are arranged so as to move principally in a single linear axis (x) it is important to note that the invention is not restricted to linear motion. The invention has particular utility in providing a highly compact arrangement for precise angular measurement in large through-shaft or hollow-bore arrangements where axial or radial space is limited. FIG. 3 shows a centre line section of a rotary, through bore form of the detector. The field emitted by the antenna 2 substantially envelopes discrete target areas 1 but does not extend far beyond for reasons of good electromagnetic compatibility, but sufficiently far to ensure that any small variations in the z and y axes do not produce measurement errors. Preferably, the antenna 2 faces a metal surface 6 which partially protects the antenna 2 from external far field emissions; limits the extent of its field and minimises the effect of other, nearby metal parts such as bearings, couplings or fasteners. Preferably, the stand-off distance ($z_1$) should be kept as small as practically possible. For a target area 1 of nominal 10 mm width and a pattern pitch distance L of 10 mm a stand off distance of 0.5 mm is suitable. The distance z2 of the metal surface 6 from the antenna 2 should be at least as large and preferably much larger than the distance between antenna 2 and target 1. The target may also face a metal surface for similar beneficial reasons. The distance [z3] of the metal surface [7] from the target [1] should be at least as large and preferably much larger than the distance between antenna [2] and target [1]. Given that the preferred measurement algorithm is ratiometric, any slight variation in the stand-off distance [$z_1$] will not, within limits, have a large effect on measurement performance. This is advantageous in permitting generously toleranced and hence inexpensive and readily achieved mounting arrangements.

FIG. 4 shows plan views of various discrete target areas 1 which may be used as a method to produce the required pattern along the measurement path. FIG. 4a shows a target 1 which has been produced by metal stamping. Since the inductive effect is chiefly determined by the planar surface of the target 1 the thickness of the material is relatively unimportant and may vary from in the order of tens of microns to millimetres or thicker. The areas in 4a are triangular in cross-section and spaced apart at regular intervals. The triangular form may also be part of a relief configuration rather than necessarily formed as laminar.

FIG. 4b shows a target [1] which has been produced using a printed circuit board method where the individual areas have been photo-lithographically etched on to an insulating substrate such as 1.6 mm FR4 grade laminate. The discrete target area may be conductive or magnetically permeable.

FIG. 4c shows an alternative construction in which the target areas have been produced using a square design and the squares have been stamped or machined from a metal strip. Other shapes of hole might include round, rectangular, pentagonal, hexagonal etc.—i.e. any shape hole which, when spaced along the measurement path, would cause a periodic variation in inductive coupling as the windings pass over it.

The target's variation in its pattern does not necessarily mean variation in the conductive or magnetically permeable material's width across the measurement path. A similar patterning effect may also be achieved by increasing and decreasing the density of rows of drilled holes on a conductive substrate. Similarly, etching a pattern of electrical conductors with increasing and decreasing density on the surface of an insulating substrate may also be effective.

FIG. 4d shows a further etched design whereby conductive areas are produced using 2 rings or shorted turns. This technique is especially advantageous as it lends itself to shaping the target's 1 shape so as to produce a more linear output from the detector as would otherwise be produced with simple, plain circles. Other higher harmonic components with respect to the fundamental pitch of the target 1 may be added to the target's 1 pattern to improve linearity.

The detector's use of an inductively resonant target 1 is feasible. Such arrangements use a winding arranged in electrical series with a capacitor so as to form a resonant or tank circuit. Whilst feasible, it is usually not preferred because it is more difficult to minimise the effect of the energised electronic circuit on the target 1 facing the antenna 2.

Figure 6:
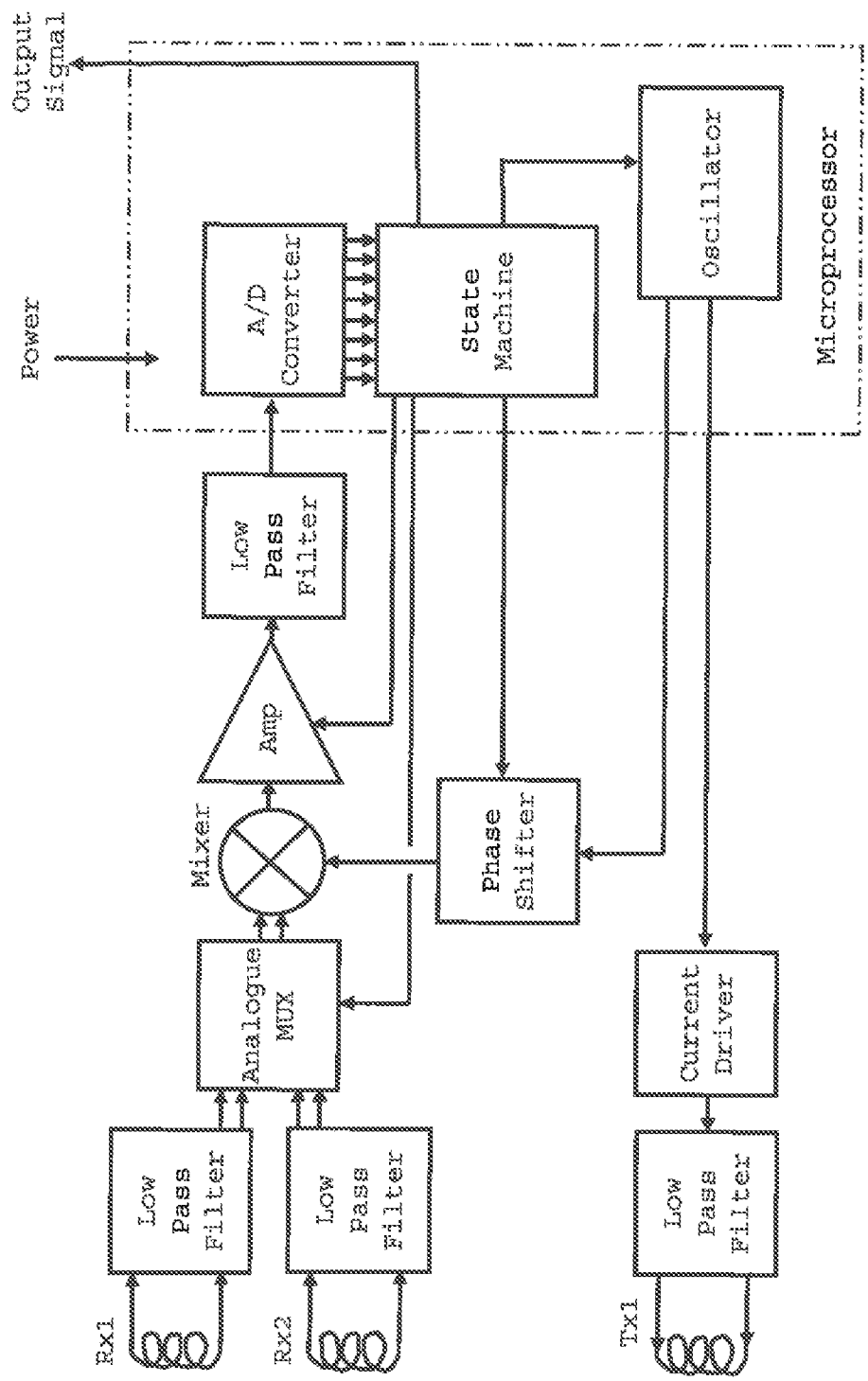
FIG. 6 shows a schematic of an electronic circuit suitable for operation with the detector when using winding patterns as shown in FIG. 2.

FIG. 6 shows a schematic of the electronic circuit 4 which is largely self explanatory. In addition, the power supply may pass through an over voltage protection circuit if voltage spikes are possible from the electrical supply. Reverse polarity protection (not shown for reasons of clarity) is also a common requirement. Preferably, the circuit 4 is constructed from an application specific integrated circuit or surface mount electronics on the same printed circuit board as the antenna 2. For the highest measurement speeds, the analogue multiplexer is removed and separate receive amplifier channels are used.

The various embodiments described so far have used a simple, periodic, regular variation of the target's 1 extent along the measurement axis which provides incremental measurement. This can be particularly useful for speed measurement, however, one drawback of periodic arrangements is that the measured position is ambiguous rather than absolute over multiple pitches. Absolute position measurement can be achieved using a number of methods which are described in the following paragraphs, as well as permutations and combinations of these methods.

The first method is to convert the detector's ambiguous or incremental output by the electronics circuit 4 incrementing or decrementing a count held in software each time a pitch is passed.

A second method to obtain absolute position measurement is to use a second, coarser pitch arrangement of a second target 1 and second antenna 2 extending over the required measurement scale. In this way an approximate position can be ascertained using readings from the coarse scale and a fine resolution reading taken from the first, repeating scale. The same concept can be extended to cover a Gray or binary scale.

Figure 5:
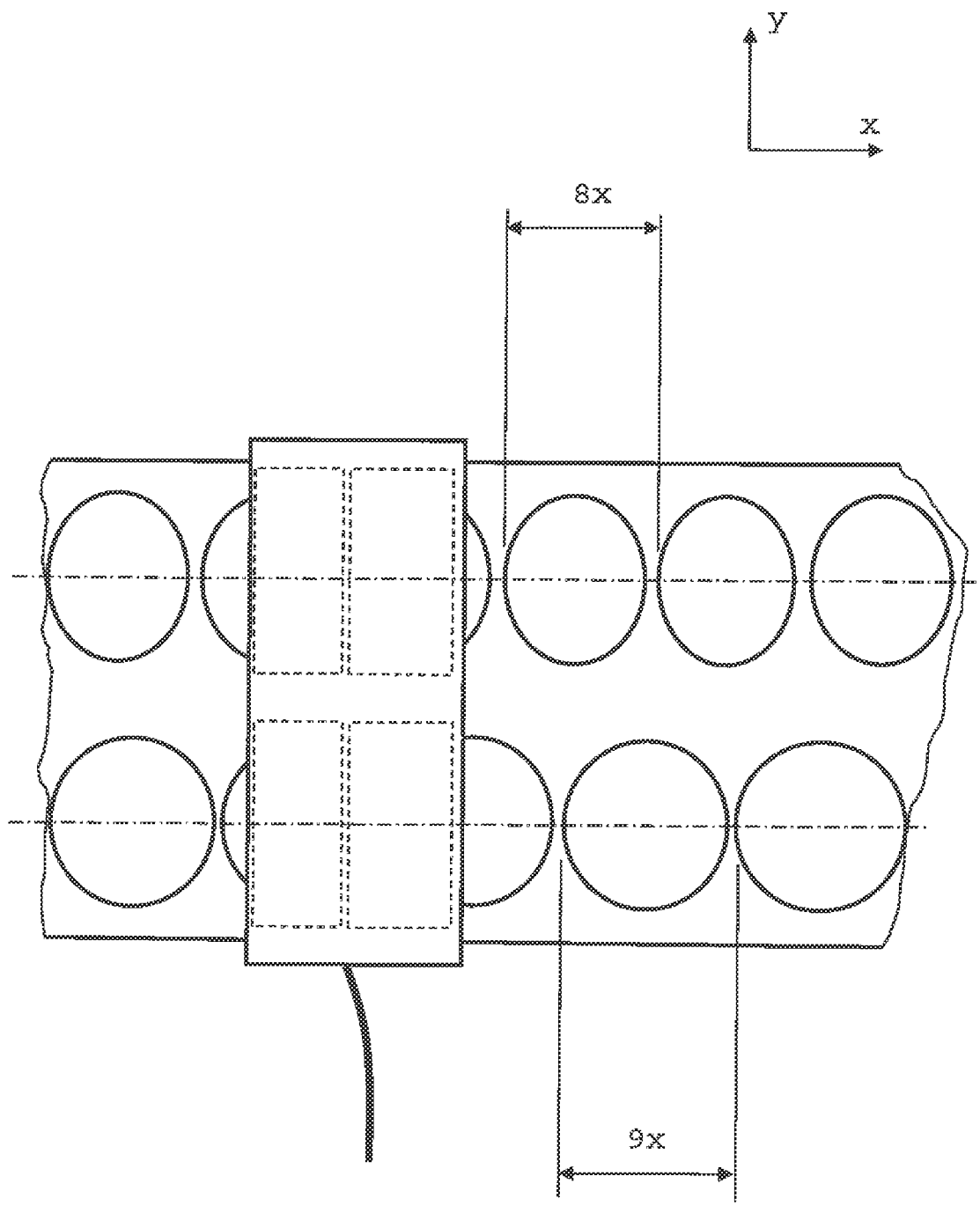
FIG. 5 shows a plan view, simplified schematic of a linear form of the detector with two sets of targets arranged at differing pitches for absolute position measurement.

A further method to obtain absolute measurement is to use a Vernier technique. A schematic of such an arrangement is shown in FIG. 5. This technique uses two or more multi-pitch periodic patterns of discrete target areas 1. A first series of target areas of pitch 8× is used with a second series of pitch 9×. The ambiguous readings from each pattern can be combined so as to provide a unique indication of position. The unique indication will be preserved up to the lowest common multiple of the pitches. In this example, the lowest common multiple is 72×. This length may be extended by choosing different pitches such as 25× & 26× or by adding a third pattern and so on.

Figure 7:
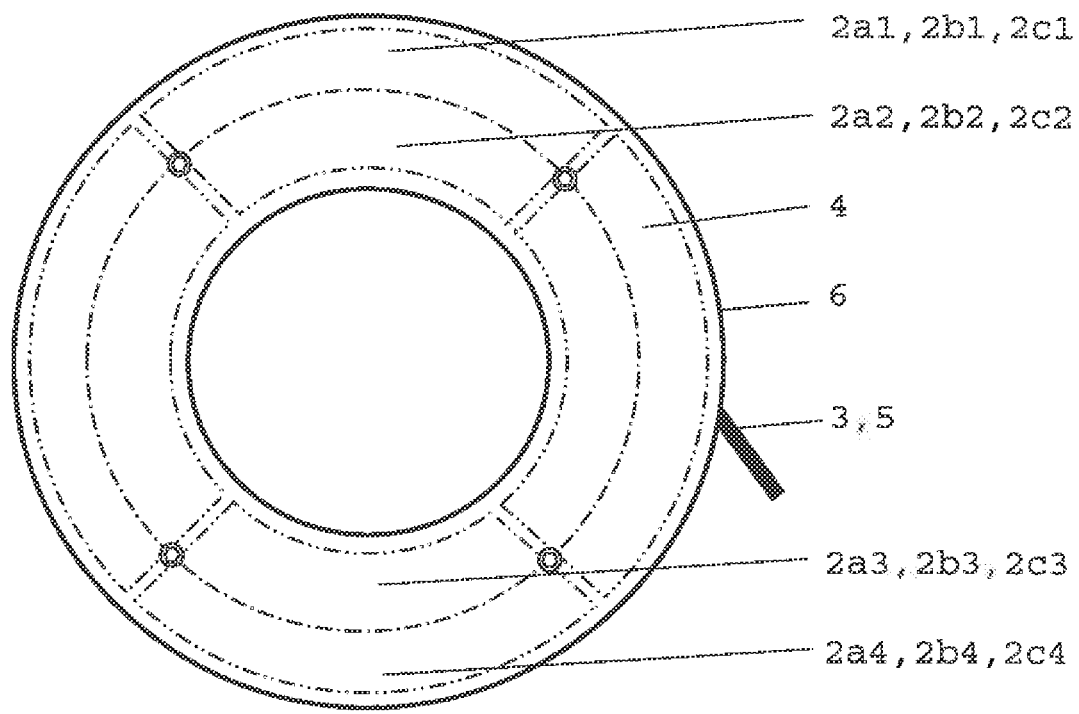
FIG. 7 shows the faces of the detector arranged for absolute rotary position measurement with a stator and rotor, where the stator has multiple antennas.
Figure 7:
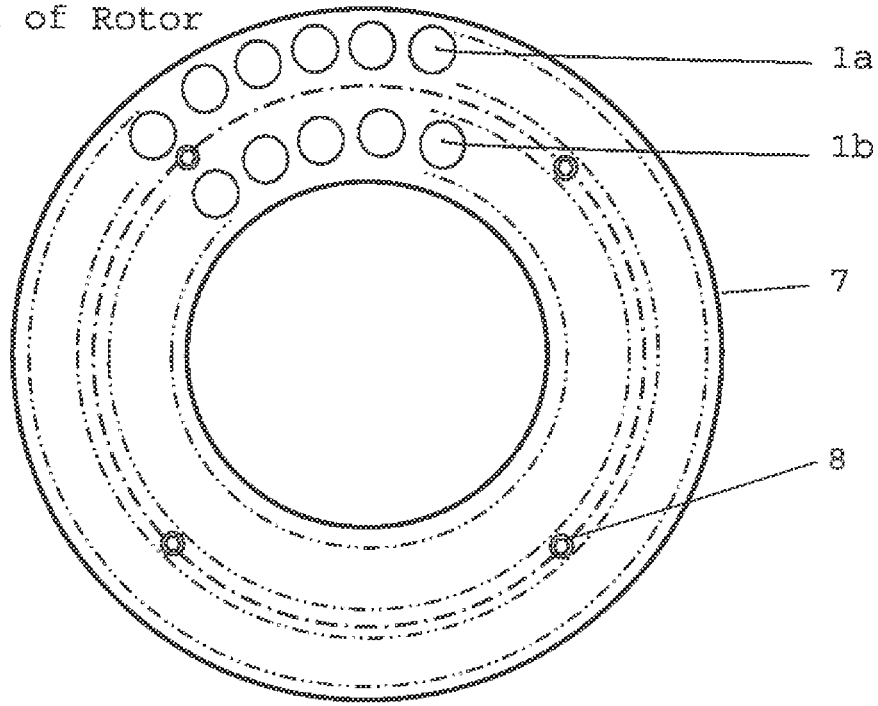

FIG. 7 shows the faces of the detector arranged for angular measurement. The stator and rotor are provided with multiple antennas and arranged for absolute position measurement using two targets 1—an inner and an outer—whose pitch distance varies so as to form a unique (Vernier) pattern over 1 revolution. Facing the inner and outer targets 1 on the rotor are corresponding sets of inner and outer windings respectively referenced 2a1, 2b1, 2c1 and 2a2, 2b2, 2c2 on the stator. As those skilled in the art will appreciate, maximising the extent of the windings around the annulus as far as practical, using multiple winding pitches, will maximise measurement performance since any localised imperfections in target 1 or antenna 2 tend to be averaged out across the multiple pitches. Advantageously, third and fourth sets of windings are arranged in other, preferably diametrically opposite, areas of the stator respectively referenced 2a3, 2b3, 2c3 and 2a4, 2b4, 2c4 in order that any effects due to non-concentricity between rotor and stator are minimized. This type of arrangement is particularly useful as it provides space for countersunk mountings screws 8 or other appropriate fasteners to be inserted in the gap between the sets of target areas 1 and between the various antenna 2 areas. In applications with very tight space constraints the use of plastic screws is advantageous in order that the inductive effect from metal screws is avoided. Furthermore, in applications with tight space constraints, it is possible to overlap the inner and outer antennas in the radial direction without any significant loss of signal fidelity.

MODIFICATIONS AND FURTHER EMBODIMENTS

The detector may be deployed in a variety of geometries including linear, rotary, curvilinear and 2-dimensional.

There is no absolute size limitation to the invention. The limits are only set by limits of manufacturing processes rather than physical laws. At one extreme, very long or large targets 1 can be produced by manufacturing methods such as, but not limited to, pressing or blanking steel strip; laser cutting steel; electro-deposition on to ceramics or glass; printing of conductive inks on to insulating substrates; self adhesive metallised disks stuck to an insulating substrate etc.

A variety of materials for the target carrier 9 enable the detector to work in a wide range of environments. Glass is particularly advantageous given its stability and low co-efficient of thermal expansion. The target 1, antenna 2 and electronics circuit 4 with this invention may be partially or completely surrounded by a housing, shielding or encapsulant. A complete shield may be conductive provided that its thickness between the target 1 and antenna 2 is below the skin depth at the detector's excitation frequency.

In high accuracy applications and in any one of the preceding aspects, the thermal expansion and contraction of the detector's components can lead to measurement error and hence loss of accuracy. These thermal errors may be counteracted by measuring temperature and feeding in a corresponding temperature coefficient to the position calculation carried out in the electronic circuit 4. Advantageously, the temperature may be found by measuring the resistance of a conductive track on the antenna 2. In this way the average temperature adjacent to the target 1 may be measured rather than in a local hot or cold spot as might be experienced by a traditional thermocouple, for example.

The target 1 and target carrier 9 need not be rigid. If the conductive pattern is deposited on a flexible substrate such as Mylar or polyester then the detector may be deployed in more complex geometries for example, coiled up and unwound or stuck down to complex surfaces or profiles.

Within limits, variation in the position of the target 1 relative to the antenna 2 in axes other than the main measurement axis does not affect the measured value. In particular, the distance $z_1$ between target 1 and antenna 2 in the z-axis can vary without substantially altering the measured displacement. The range of acceptable variation can be extended by adjusting the amplification factors used in the electronics circuit 3 according to the amplitude of the received signals $V_{rx1}$ and $V_{rx2}$. If the target 1 to antenna 2 distance is large then the amplitude of received signals $V_{rx1}$ and $V_{rx2}$ will be small and larger amplifications should be applied. The converse applies if target 1 to antenna 2 distance is small.

Thus far the detector has mostly been described using one transmit winding 2c and two receive windings 2a and 2b. As will be appreciated by those skilled in the art, there is a variety of further permutations and arrangements of windings in the antenna 2 including, but not limited to, windings arranged on either side of the target. Arranging the antenna 2 windings on either side of the target 1 is not preferred due to the restrictions that such an arrangement places on mechanical mounting. For simplicity of construction and good measurement performance, an arrangement of target 1 substantially in one plane and the antenna 2 and electronics circuit 3 substantially in a second plane, facing the target 1 is preferred as this provides a compact arrangement. Further, there are other possible excitation and position calculation techniques such as the use of a high frequency excitation frequency modulated by a lower frequency signal so as to provide lower speed signal processing. This is not preferred due to its relatively low speed of operation and higher complexity. A further embodiment is to swap the transmit and receive functions whereby the transmit winding described thus far becomes the receive winding, and the receive windings described thus far become transmit windings. A still further embodiment uses the phase of the received signals rather than amplitude.

An alternative to the winding pattern shown in FIG. 2, other embodiments envisage the uses of simple spiral windings whose inductance changes proportionally to the position of the target 1. In such an approach separate transmit and receive windings are avoided. Such an approach also enables the use of simple wire-wound spools and so reduces cost but also tends to decrease measurement performance compared to more sophisticated winding arrangements.

Multiple targets 1 may be constructed on the same carrier 9 by simply displacing patterns away (in the y-axis) from each other and avoiding electrical connection. Such constructions are particularly advantageous in detectors for safety related environments where electrical redundancy is necessary. In an electrically redundant system a multiplicity of targets 1 may be formed on the same carrier 9 and they may be concurrently detected using a multiplicity of antennas 2.

What is claimed is:

1. An inductive position detector comprising a first and a second body, at least one of said bodies being displaceable relative to the other in a measurement direction along a measurement path, said first body comprising one or more antenna windings for transmitting and receiving signals; said first body further comprising an electronic circuit for energising said antenna windings for transmitting signals and for processing signals induced in said antenna windings; wherein said second body comprises a plurality of discrete target areas provided along said measurement path; said discrete target areas being either electrically conductive or magnetically permeable; whereby induced signals vary in accordance with the relative position of the first and second body; wherein said antenna windings and said electronic circuit for energising said antenna windings and for processing signals from said antenna windings are located adjacent to one another; said antenna windings and said electronic circuit being longitudinally arranged and spaced in said measurement direction; whereby they respectively overlap different regions of said plurality of discrete target areas.

2. A detector according to claim 1, wherein said electronic circuit is located in the same plane as said antenna windings.

3. A detector according to claim 1, wherein said first body and said second body are annular and configured to overlap one another, said one or more antenna windings being provided in a first section of said first body and said electronic circuit being provided in a second section of said first body; said second section being separate from said first section.

4. A detector according to claim 3, wherein said first body comprises a further section which is separate from said first and second sections; said further section comprising one or more further antenna windings.

5. A detector according to claim 4, wherein said first section and said further section are provided diametrically opposite one another with said second section being provided between said first and further section.

6. A detector according to claim 4, wherein said first body further comprises an insulating substrate and an electromagnetic shielding layer; said insulating substrate being a carrier for said antenna windings; at least one fastener being provided to secure said substrate to said shielding layer; said fasteners being provided outside of said first section.

7. A detector according to claim 1, wherein said first body comprises at least two separate adjacent sets of antenna windings which overlap, in use, with at least two corresponding separate sets of target areas; each set of target areas forming a measurement path whereby two disparate measurement paths are provided adjacent to one another.

8. A detector according to claim 7, wherein the target areas of a first measurement path differ in configuration with respect to the target areas of a second measurement path.

9. A detector according to claim 1, wherein said discrete target areas form a periodic pattern of laminar conductive areas.

10. A detector according to claim 9, wherein said periodic pattern comprises areas whose width perpendicular to the measurement path varies continuously along the measurement path.

11. A detector according to claim 1, wherein said discrete target areas form a periodic pattern of magnetically permeable areas.

12. A detector according to claim 1, wherein said areas are circular areas.

13. A detector according to claim 1, wherein said areas are elliptical.

14. A detector according to claim 1, wherein said areas are rectangular.

15. A detector according to claim 1, wherein said areas are annular.

16. A detector according to claim 1, wherein said discrete areas are defined by two closed loops, one of which being located within the other.

17. A detector according to claim 16, wherein the inner loop varies in radius about its circumference.

18. A detector according to claim 1, wherein said areas are part of a periodically repeating shape.

19. A detector according to claim 1, wherein said areas are defined by a plurality of discrete windings, each of which are provided in series with a capacitor to form a plurality of discrete resonant circuits along the measurement path.

* * * * *